Oct. 2, 1951

P. SALVANESCHI 2,569,538

APPARATUS AND METHOD FOR MOLDING TUBES
FROM CEMENTITIOUS MATERIAL

Filed July 20, 1949

INVENTOR
PINO SALVANESCHI
By:
Haseltine, Lake & Co
AGENTS

Oct. 2, 1951  P. SALVANESCHI  2,569,538
APPARATUS AND METHOD FOR MOLDING TUBES
FROM CEMENTITIOUS MATERIAL
Filed July 20, 1949  3 Sheets-Sheet 2

INVENTOR
PINO SALVANESCHI
BY:
Haseltine, Lake & Co.
AGENTS

Oct. 2, 1951 P. SALVANESCHI 2,569,538
APPARATUS AND METHOD FOR MOLDING TUBES
FROM CEMENTITIOUS MATERIAL
Filed July 20, 1949 3 Sheets-Sheet 3
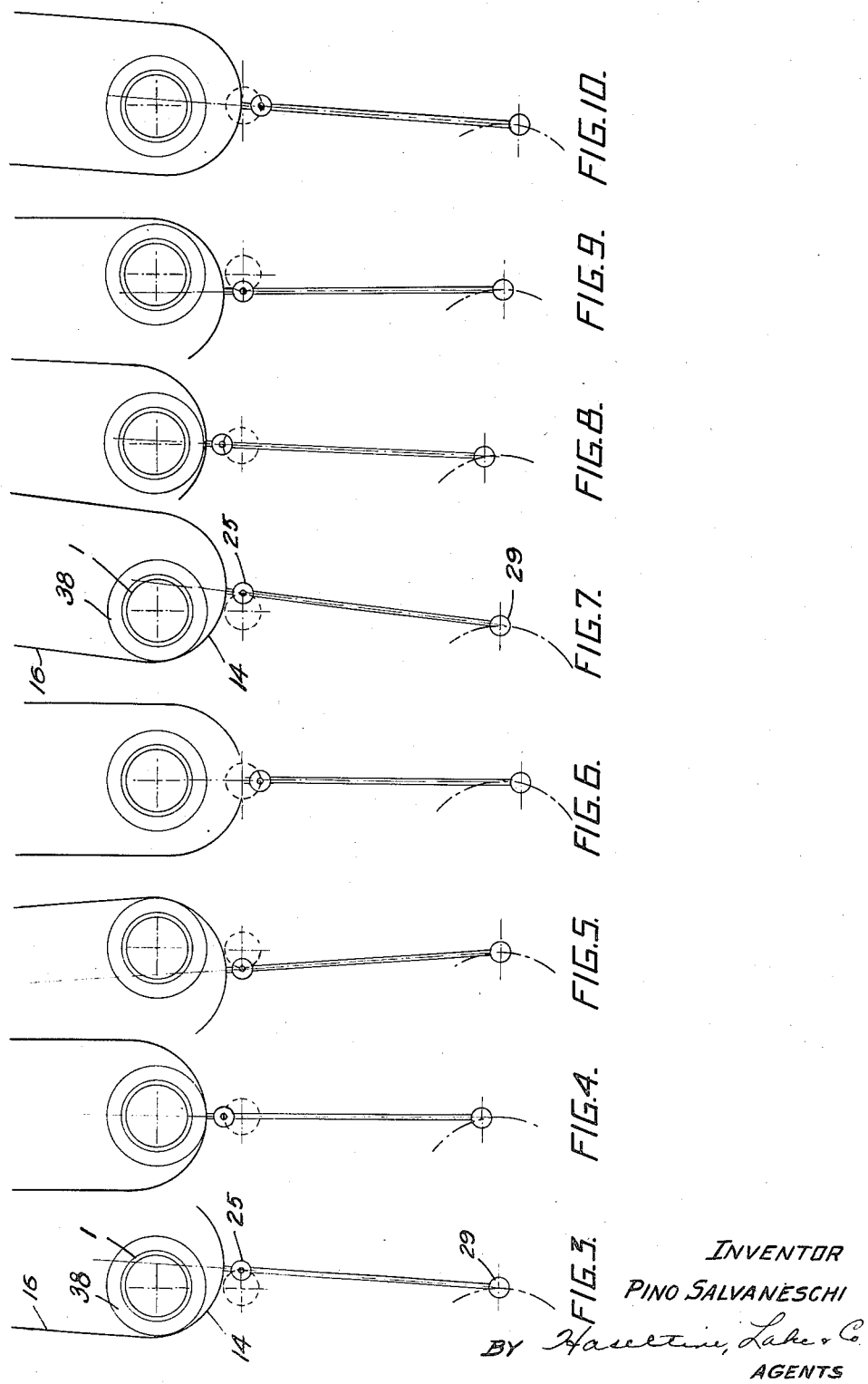
INVENTOR
PINO SALVANESCHI
BY Haseltine, Lake & Co.
AGENTS

UNITED STATES PATENT OFFICE 2,569,538

APPARATUS AND METHOD FOR MOLDING TUBES FROM CEMENTITIOUS MATERIAL

Pino Salvaneschi, Mexico City, Mexico

Application July 20, 1949, Serial No. 105,704
In Italy August 21, 1948

19 Claims. (Cl. 25—30)

Processes are known for the manufacture of tubes of fibrous cement produced by wrapping pre-formed layers of paste and applying them successively round a rotatable core.

Other processes are also known by which the tubes are constructed between pairs of rotating cylinders. Known likewise is the process by which the tubes are produced by suitably pouring the paste on a shaking table acting against a porous mandrel.

A new process has now been found which permits of obtaining with truly remarkable rapidity and by much more simple means from pastes capable of hardening, tubes and generally hollow solids of revolution, which may be of different thicknesses and various diameters along one and the same generatrix. The advantages which characterise this new process are the following:

Simplicity of means for carrying it out.

Possibility of obtaining if not completely automatic operation, at any rate semi-automatic production.

Rapidily of production, inasmuch as it has already been experimentally determined that for certain diameters and thicknesses the total time of manufacture and compression may be reduced even to 30 seconds.

Possibility of using up the whole of the paste without waste.

Possibility of obtaining thicknesses within very limited tolerances.

Excellent external finish and excellent qualities of strength.

The possibility of producting tubes, the internal parts of which are specially suited for resisting the strains of hydrostatic pressure and the external parts of which are of very cheap material.

Possiblity of obtaining tubes from cement pastes with very few fibres and even without fibres.

Possibility of producing reinforced tubes with cage, spiral and double spiral armouring, the reinforcement being embodied in the tube during its formation.

Possibility of centering such reinforcement without supporting it.

The new process is characterized by the fact that the tube is formed and compressed on a permeable mandrel, subject internally to an action of suction, while the said mandrel rotates within a trough or channel containing the paste, the channel being subjected to a periodical motion not parallel to the axis of the tube.

The new apparatus for carrying out this process is characterised by a permeable mandrel, means for producing a vacuum within this mandrel, a channel containing this mandrel, means for imparting a periodical motion to this channel along a direction which is not that of the axis of the tube and means to cause the mandrel to rotate.

The new process and the new apparatus are hereinbelow described and thereafter claimed.

By way of example there is described below an embodiment of the apparatus with reference to the drawings appended in which:

Figs. 3 to 10 are diagrammatic representations of different positions of the channel with respect to the mandrel in two cases.

Figure 1:
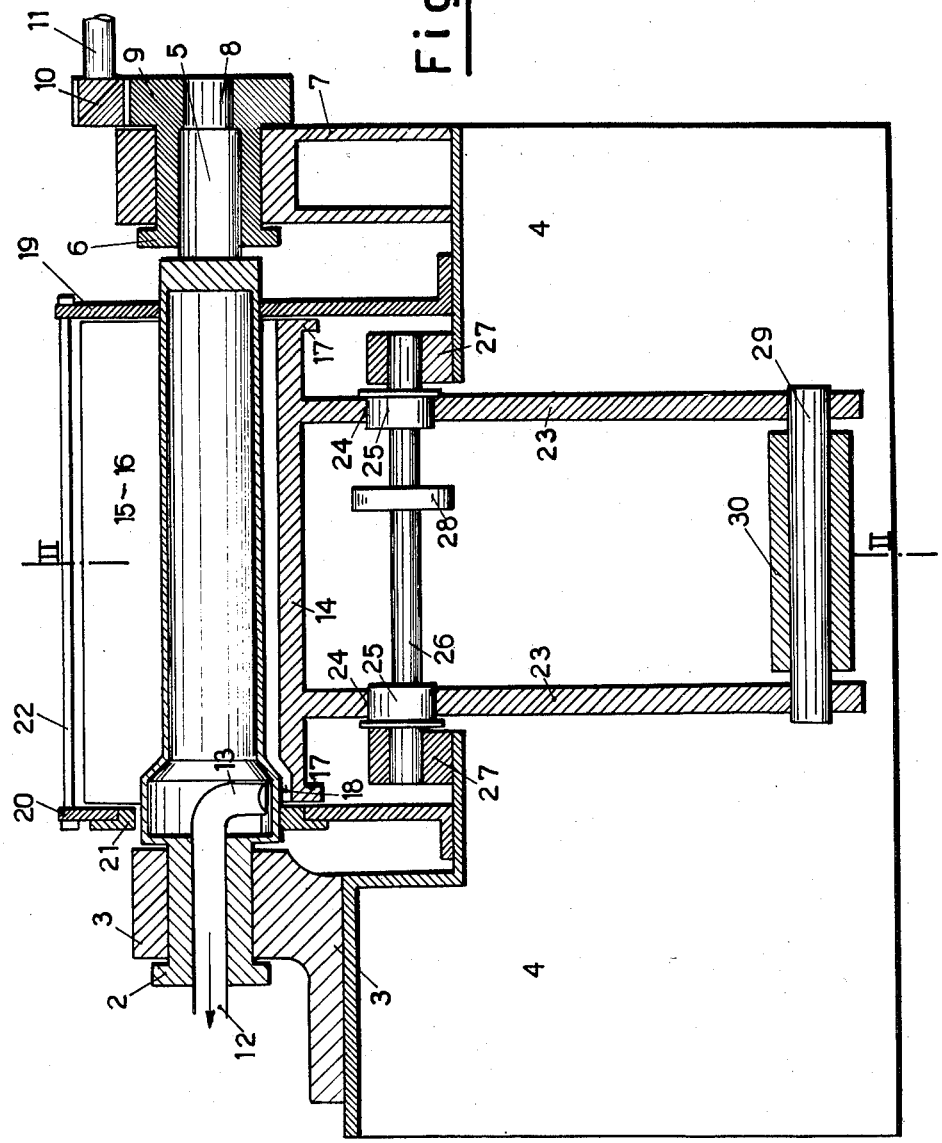
Fig. 1 is a longitudinal section of the apparatus along the line I—I of Fig. 2.

With reference to the drawings, 1 is the permeable mandrel, the end journal 2 of which is rotatable in the support 3, the base of which is a slide which can travel along suitable guides in the framework 4.

At the other end the mandrel has a journal 5 inserted in a bush 6 rotatable on the support 7 which is fixed to the frame-work 4.

The journal 5 is slidable in the bush 6 and its end portion 8 is of square cross-section and engages in a square portion of the hole of the bush 6.

The bush 6 has a toothed rim 9 which meshes with a pinion 10 with shaft 11 driven by known means, for example motor or reduction gearing; therefore when the shaft 11 rotates, the mandrel 1 also rotates.

The end journal 2 is bored and has inside it a tube 12 with suction elbow 13; tube and elbow do not rotate and the tube is connected to a suction pump.

14 is a channel fitted with the two walls 15, 16; the channel has two flanges which improve lateral tightness.

In the interior of the channel there is hollowed out at one end a recess 18 which corresponds to the socket of the tube to be produced; there is likewise a corresponding recess in the walls 15 and 16.

19 and 20 are two plates fixed to the framework and their internal distance is equal to the length of the channel and equal to the length of the tube to be made.

The plate 19 is apertured to allow the passage of the mandrel; the plate 20 is provided with a hole which allows the passage of the finished tube and in this case the socket of the tube.

In this hole there is lodged a ring 21 which can easily be fixed and removed, the aperture of which is slightly greater than the diameter of the mandrel at this part.

The surface of the ring directed towards the interior of the channel is on the same plane as the internal surface of the plate.

22 are two tie rods which regulate the distance of the two plates in such a way that the channel can move between them without having any play in the direction of the axis of the mandrel.

23 are two ribs joined to each other and joined to the channel, they constitute the tail portion of the channel and have two holes 24 in which there are lodged two eccentrics 25 in phase with each other, and both keyed on the shaft 26 rotatable on the supports 27 and driven by the pulley 28 which takes its movement from a motor, for example by means of a belt.

In the lower part of the tail there is a pivot 29 which carries a lever 30 which, at the other end, is pivoted by means of a pin 31 to another lever 32 connected by fulcrum pin at 33 to two lugs 34 projecting from the framework 4. The lever 32 is held in position by a spring 35 which thrusts it against the frame and by a screw 36 the female screw of which is cut in the lever 32 itself. One end of the screw rests against the framework and the other end carries a handwheel 37 by rotating which it is possible to approach the lever 32 towards or make it recede from the framework. Consequently, by regulating this handwheel it is possible to displace the pin 31, the lever 30 and the pivot 29.

In other words, the tail of the channel will be displaced and consequently the channel itself will be shifted in the opposite direction.

It is therefore possible with this device to vary transversely the position of the channel relatively to the mandrel and this displacement can be effected both when the apparatus is stopped and when it is in motion.

The adjustable spring 35 will elastically oppose the forces which might tend to make the lever recede from the framework. By rotating the shaft 26, the result is obtained that the pivot 29 will shift periodically along an arc of a circle having as its centre the joint 31, while each point of the channel will describe periodically a path the form of which depends on the cynematic characteristics of the operating device.

With reference to Figures 3 to 6 the axis of rotation of the mandrel, the axis of the shaft 26 which carries the excentric and the axis 29 of the lower pivot are in the same straight line and the internal curvature of the channel 14 is such that in the three positions of Figs. 3, 4, 5, the minimum distance of the channel from the mandrel is constant and equivalent to the thickness of the finished tube 38.

If on the other hand the pivot 29 is shifted to the left as in Figs. 6 to 10 the consequence will be that there will be the minimum distance of the channel from the mandrel in the case of Fig. 6.

In any case the velocity of the point of the channel which is nearest to the mandrel must not be less than the velocity which said point would have if it were integral with the mandrel, otherwise the paste would be detached from the mandrel.

The example illustrated represents one of the forms of apparatus which allow of carrying out the process. Nevertheless its details may be varied without going beyond the scope of the present invention.

For example, it is possible by known means to vary the excentricity of the excentric 25 and this variation can even take place during the operation of the apparatus, or else the supports 27 can be mounted on slides so as to allow of regulating their position horizontally or vertically, for example, the actual movement of the channel can be replaced by any other movement provided it is not directed along the axis of the tube, and according to the paste employed in the cynematic characteristics of the movement of the canal must be suitably calculated. The screw 36 can be replaced by another apparatus which allows of causing the lever 32 to recede from the frame.

Or again, the entire device 30, 31, 32, 33, 34, 35, 36, 37 may be applied on the opposite part of the framework. The spring 35 may be replaced by another shock absorber, pneumatic, hydraulic or mechanical.

Means may also be provided for balancing the masses in alternate motion and in particular there may be combined on the same framework two devices acting on two mandrels so that the masses in alternating motion of one apparatus act in the opposed phase with the masses in alternating motion of the other apparatus, so that they can balance each other. The joint or articulation 29 can be formed by an elastic material and the pin 31 can be fixed directly to the framework. In the same way the slide 3 can be actuated by any of the known means, whether pneumatic, mechanical or hydraulic. The movement of the channel may be likewise not always at right angles to the axis of the mandrel 1 but could be guided in such manner as likewise to have a component parallel to the said axis.

In order to proceed to manufacture the tube the following course may be adopted: into the channel as described and as shown in Fig. 1 there is poured the whole of the paste previously prepared and intended for the manufacture of the tube, and the paste will occupy the whole of the free space between the mandrel and the channel.

The interior of the mandrel is put into communication with the suction pump, the mandrel itself is set rotating, causing the shaft 11 to rotate and the channel is put into periodic motion, causing the shaft 26 to rotate.

If the quantity of paste put in is correctly proportioned, in a short time all the paste will be collected round the mandrel. On continuing the suction action, the rotation of the mandrel and the periodical motion of the channel a further compression of the tube will be obtained if that is considered desirable.

At this point the movement of the shafts 11 and 26 is stopped, the suction action is interrupted, the ring 21 of the plate 20 is released, the slide 3 is made to move in such a way that the whole of the mandrel passes out of the aperture in the plate 20 and between the ends of the mandrel and the said plate a sufficient space is produced to allow of removing the tube. The tube is slipped off by applying pressure on the ring 21, and the said tube is supported by known means or else the mandrel is removed from the support 3, and setting it vertically the tube is slipped off by means of the ring 21.

According to the paste used for the manufacture of the tube and according to the particulars to which the tube is to correspond it will be possible and in some cases desirable to adopt some of the measures indicated below.

As regards feeding the paste into the channel, for example, one of the following methods may be adopted:

A. The paste required for the manufacture of the tube may be poured entirely into the channel containing the mandrel before starting the manufacture. In that case it may happen that the quantity of the paste poured in is in itself sufficient in order that the mandrel, when manufacture is begun, shall rotate completely immersed in the paste. When that does not happen, the paste may be made moist so that the mandrel is completely immersed, in order that manufacture shall start simultaneously at every point of the mandrel.

B. Or else the paste can be partly poured in before starting manufacture, the remaining paste being added during manufacture, but always proceeding in such manner that at the end of each cycle of the periodical motion of the channel there shall still remain in the channel a certain quantity of paste which has not yet adhered to the mandrel.

The paste poured in before beginning manufacture may be different from the paste poured in subsequeently and in the particular case of pastes formed of cement and fibre it may be richer in fibre or have stronger and longer fibers than the paste poured in subsequently. In that case the resulting tube will be at once economical and specially suitable for withstanding hydraulic pressure.

In the example shown in diagram in Figs. 3 to 6 the minimum distance of the channel from the mandrel is constant in the three positions shown in Figs. 3, 4, 5, so that the compression of the tube 38 will take place substantially in the same way in the three positions.

If, as has been said, the pin 29 is displaced to the left, the result will be that the distance between the channel and the mandrel will be least in the position shown in Fig. 7, a little greater in the position shown in Fig. 8 and still greater in the position shown in Fig. 9.

In other words, it will be in the position shown in Fig. 7 that the maximum pressure is exerted.

Proceeding to manufacture the tube with the apparatus under these conditions, if the quantity of paste poured in is slightly excessive, what will happen is that when the paste is about to be adherent in its entirety on the mandrel, each time the channel is in the position shown in Fig. 7 the bottom pin of the tail will tend to shift to the right.

Figure 2:
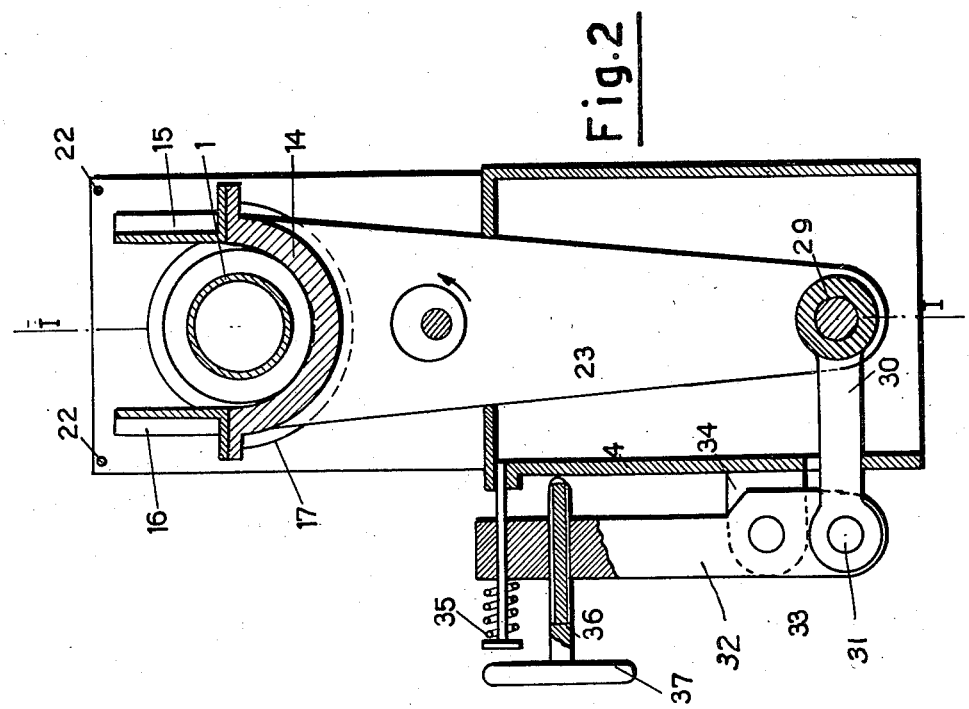
Fig. 2 is a cross-section along the line II—II of Fig. 1.

The spring 35 (Fig. 2) will then intervene, elastically opposing this movement.

By rightly adjusting the spring 35 the required compression of the tube will be obtained and this compression will be constant even if the quantity of paste used is in excess relatively to the quantity theoretically required in order to produce a given thickness.

By maintaining the pivot of the tail always displaced to the left and suitably regulating the screw 36 by means of the handwheel 37, it will be possible to vary the thickness of the tube even during manufacture.

It is also possible with the machine under these conditions to compress any tube wound round a permeable mandrel and in this case the compression will be obtained by duly adjusting the spring 36 so that the tail pivot recedes gradually from the straight line joining the axis of the mandrel with the axis of the shaft carrying the excentrics. Or again the compression may be obtained by increasing during operation the excentricity of the excentric 25. Or again the compression may be obtained by suitably displacing the supports 27. In certain cases it will also be desirable to effect the formation of the tube in an apparatus, to remove the mandrel clothed with the tube thus formed and to mount it on another apparatus in order to complete its compression; the speed of rotation of the mandrel and the characteristic of the periodical movement of the channel may be the same or different in the two machines used as above in the manufacture of the same tube. In each case the paste may be of any kind. By way of example there may be mentioned a paste of cement and fibrous material, for example asbestos, but it is obvious that the process is applicable likewise with other pastes such as will allow of a hardening of the hollow body after its formation.

It is also possible to arrange a reinforcement on the mandrel before application of the paste, for example metallic, in spiral or cage form having an internal diameter greater than the mandrel and of course an external diameter less than the external diameter of the tube to be constructed; by the process described above the reinforcement is satisfactorily centred.

Having now particularly described and ascertained the nature of my said invention, and in what manner the same is to be performed, I declare that what I claim is:

1. Process for the manufacture and the compression of tubes from pastes capable of hardening, thereby characterised that the tube is formed and compressed on a permeable mandrel subjected internally to a suction action while the said mandrel rotates in the interior of a channel containing the paste by subjecting said channel to a periodical motion in a direction not parallel to the axis of the tube, the tubes thus produced being successively taken off.

2. Process according to the preceding claim, characterised by the fact that the whole of the paste required for the manufacture of the tube is poured into the channel containing the mandrel before beginning the manufacture of the tube.

3. Process according to claim 1, characterised by the fact that part of the paste is poured into the channel during the formation of the tube, pouring during a complete cycle of motion of the channel a quantity of paste greater than that which has been made to adhere to the mandrel during the said cycle.

4. Process according to claim 1, characterised by the fact that different qualities of paste are successively poured into the channel partly during formation of the tube.

5. Process according to claim 1, characterised by the fact that before beginning the rotation of the mandrel a sufficient quantity of paste to submerge the mandrel completely is put into the channel.

6. Process according to claim 1, characterised by the fact that the path described by each point of the internal surface of the channel is stationary relatively to the position of the mandrel.

7. Process according to claim 1, characterised by the fact that the path which each point of the channel periodically described is, during the formation and/or the compression of the tube, displaced relatively to the mandrel in a plane perpendicular to the mandrel.

8. Process according to claim 1, characterised in that the velocity of each point of the internal surface of the channel when that point attains its minimum distance from the mandrel is directed in the same direction as that which the said point would have at that moment if it were integral with the mandrel.

9. Process according to claim 1, characterised by the fact that the velocity of each point of the internal surface of the channel when the said point attains its minimum distance from the mandrel is directed in the same direction as, and is greater than, that which the said point would have at the moment if it were integral with the mandrel.

10. Process according to claim 1, characterised by the fact that the suction action, the rotation of the mandrel and the periodical motion of the channel are continued even after all the paste has been applied to the mandrel.

11. Process according to claim 1, characterised by the fact that the paste consists of cement and fibrous material.

12. Process according to claim 1, characterised by the fact that before pouring the paste into the channel there is arranged on the mandrel a metal reinforcement of a diameter greater than the diameter of the mandrel.

13. Apparatus for the manufacture and the compression of tubes from pastes capable of hardening, according to the process claimed in 1 to 12, characterized by a permeable mandrel, means for causing the mandrel to rotate and means for producing a vacuum in the interior of this mandrel, a channel which contains this mandrel, means for causing this channel to move periodically not parallel to the axis of the mandrel.

14. Apparatus according to claim 13, characterised by the fact that the channel is pivoted on at least one pivot rotating excentrically around an axis parallel to the axis of the mandrel and on at least one other pivot having its axis parallel to the said two axes and situate in their plane beneath the first pivot above mentioned and free to move in the said plane perpendicularly to the said axes.

15. Apparatus according to claim 14, characterised by the fact that the internal transverse profile of the channel is an arc of a circle of a diameter greater than the external diameter of the tube to be formed.

16. Apparatus according to claim 14, characterised by the fact that the internal transverse profile of the channel is a semi-circle which is prolonged upwards along two tangents.

17. Apparatus according to claim 14, characterised by the fact that the channel is secured elastically in correspondence to the said second lower pivot.

18. Apparatus according to claim 14, characterised by the fact that the position of the second parallel pivot is displaceable perpendicularly to the said plane.

19. Apparatus according to claim 14, characterized by the fact that the excentricity of the said first pivot is adjustable.

PINO SALVANESCHI.

REFERENCES CITED

The following references are of record in the file of this patent:

UNITED STATES PATENTS

| Number | Name | Date |
|---|---|---|
| 2,398,016 | Lemont et al. | Apr. 9, 1946 |